United States Patent
Shike

(10) Patent No.: US 7,246,941 B2
(45) Date of Patent: Jul. 24, 2007

(54) SENSING MEDIA TEMPERATURE IN AN HVAC VALVE

(75) Inventor: David Shike, Rockford, IL (US)

(73) Assignee: Invensys Building Systems, Wilmington, DE (US)

(*) Notice: Subject to any disclaimer, the term of this patent is extended or adjusted under 35 U.S.C. 154(b) by 80 days.

(21) Appl. No.: 10/897,908

(22) Filed: Jul. 23, 2004

(65) Prior Publication Data

US 2006/0018362 A1   Jan. 26, 2006

(51) Int. Cl.
    G01K 1/14 (2006.01)
    G01K 13/00 (2006.01)
(52) U.S. Cl. .................. 374/148; 374/141; 374/147
(58) Field of Classification Search ........... 374/141, 374/42, 147, 148; 165/12, 14, 32, 247, 253; 62/157, 287, 250, 156, 159
    See application file for complete search history.

(56) References Cited

U.S. PATENT DOCUMENTS

| | | | | | |
|---|---|---|---|---|---|
| 2,495,226 | A | * | 1/1950 | Crago | 236/1 C |
| 3,028,096 | A | * | 4/1962 | Beggs | 236/80 R |
| 3,216,660 | A | * | 11/1965 | Mott | 236/1 C |
| 3,384,303 | A | * | 5/1968 | Phillips | 236/87 |
| 3,424,377 | A | * | 1/1969 | Fritz et al. | 236/1 C |
| 3,831,841 | A | * | 8/1974 | Franz | 236/13 |
| 4,039,124 | A | * | 8/1977 | Ginn et al. | 236/1 B |
| 4,139,150 | A | * | 2/1979 | Graversen et al. | 236/1 B |
| 4,151,953 | A | * | 5/1979 | Sugiura | 236/87 |
| 4,184,633 | A | * | 1/1980 | Bata et al. | 236/68 R |
| 4,232,696 | A | * | 11/1980 | Burris et al. | 137/62 |
| 4,245,780 | A | * | 1/1981 | Franz | 236/13 |
| 5,072,781 | A | * | 12/1991 | Goodman | 165/300 |
| 5,170,361 | A | * | 12/1992 | Reed | 700/283 |
| 5,251,148 | A | * | 10/1993 | Haines et al. | 700/282 |
| 5,623,990 | A | * | 4/1997 | Pirkle | 165/298 |
| 5,778,693 | A | * | 7/1998 | Mientus | 62/181 |
| 5,894,987 | A | * | 4/1999 | Layne et al. | 165/44 |
| 6,286,764 | B1 | * | 9/2001 | Garvey et al. | 236/12.12 |
| 7,140,355 | B2 | * | 11/2006 | Michelini et al. | 123/481 |
| 2004/0216701 | A1 | * | 11/2004 | Hutchins | 123/41.08 |
| 2005/0217346 | A1 | * | 10/2005 | Nagarkatti et al. | 73/1.16 |

* cited by examiner

*Primary Examiner*—Gail Verbitsky
(74) *Attorney, Agent, or Firm*—Reinhart Boerner Van Deuren P.C.

(57) ABSTRACT

An apparatus and method are provided for determining the temperature of an operating fluid media in an HVAC system. An integral temperature sensor, mounted within an actuator of an actuator-driven HVAC valve, senses the temperature of a valve body of the HVAC valve. The temperature of a fluid media within the HVAC valve is determined from the temperature of the valve body. A processor within the actuator configures the actuator to function in either a direct acting mode, or alternatively in a reverse acting mode, as a function of the temperature of the valve body as sensed by the integral temperature sensor. The actuator is adapted for attachment to the HVAC valve in such a manner that the temperature sensor is placed in operative thermal contact with the valve body by the act of attaching the actuator to the HVAC valve.

33 Claims, 6 Drawing Sheets

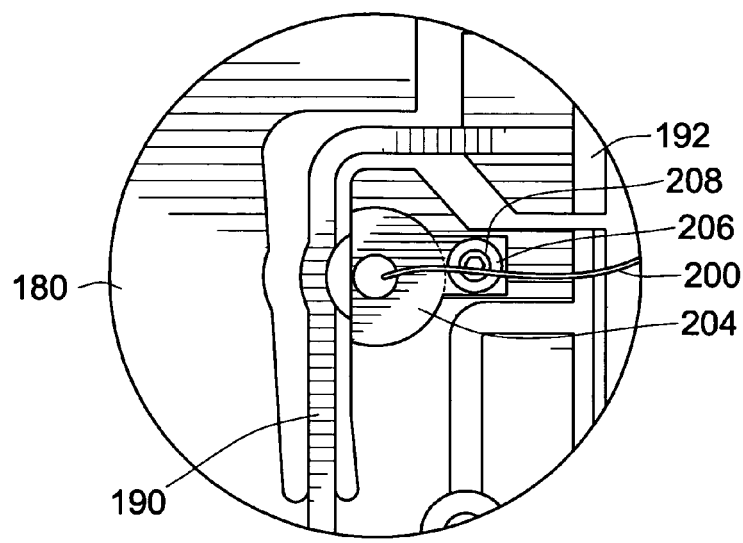
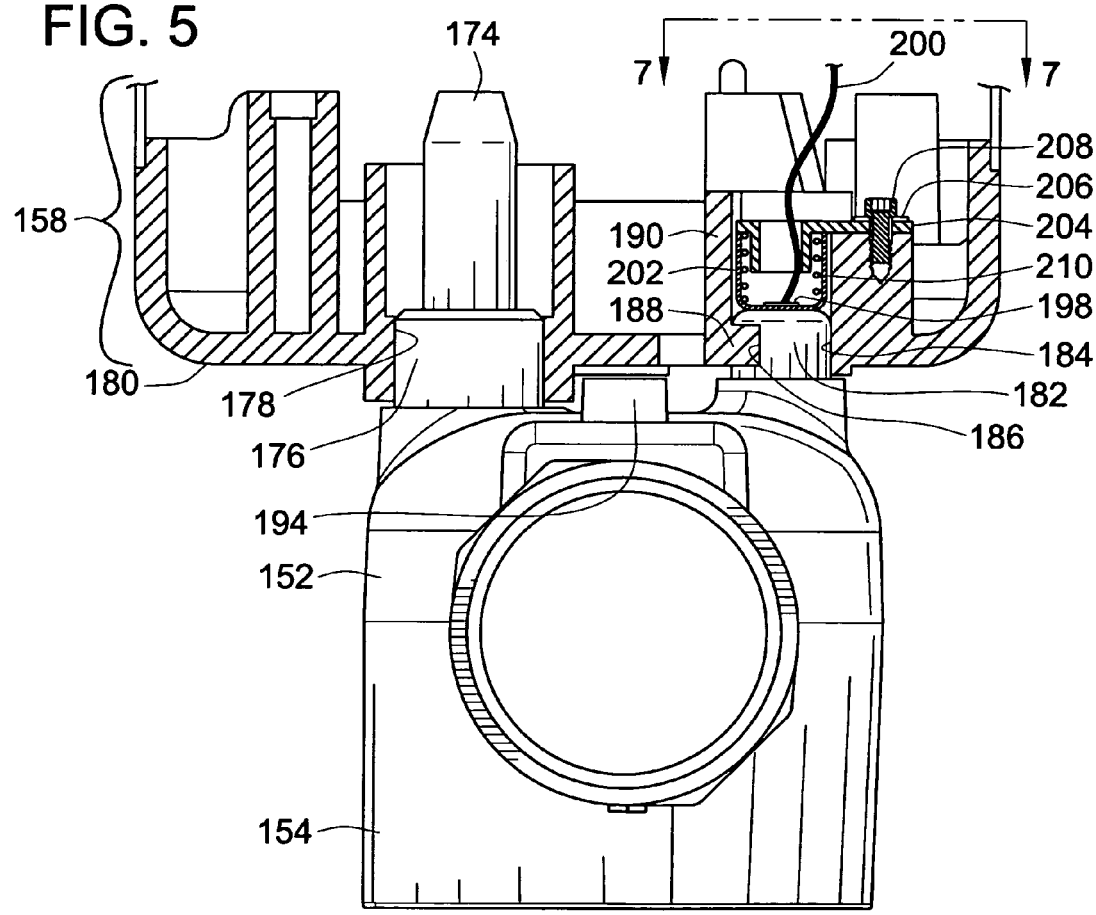

SENSING MEDIA TEMPERATURE IN AN HVAC VALVE

FIELD OF THE INVENTION

This invention relates to heating, ventilation and air conditioning (HVAC) systems, and more particularly to an apparatus and method for sensing the temperature of a media within a valve body of an actuator-driven valve of the type used in HVAC systems.

BACKGROUND OF THE INVENTION

In one type of commonly used HVAC system 110, shown in FIG. 1, an actuator-driven valve 112 modulates a flow of a fluid media, such as water, from a source 114 of hot and/or cold fluid to a heat exchanger 116, for heating and/or cooling a conditioned space 118 (to the left of dashed line 120 in FIG. 1). The valve 112 is controlled by an actuator 112 that is operatively attached to the valve 112. The actuator 122 controls the valve 112 in accordance with control signals 124 transmitted to the actuator 122 from a controller 126, such as a typical wall mounted thermostat, mounted in the conditioned space 118. The controller 126 has an input device, such as a knob, a keypad, or buttons that allow a person to input a desired room temperature to the controller 126. The controller also typically includes an internal temperature sensor, for sensing the current room temperature of the space 118.

The source 114 of hot and cold fluid is generally mounted outside of the conditioned space 118. The source 114 of hot and cold fluid is typically a centralized supply circuit, having a single boiler and chiller unit that can be alternately connected within the source 114, for supplying hot or cold fluid to multiple conditioned spaces 118, as indicated by dashed lines in FIG. 1, with each space 118 including its own separate heat exchanger, actuator-driven valve, and controller, operating as described above for controlling the temperature of that particular space, using hot or cold fluid from the centralized source 114.

When it is desired to operate the HVAC system 110 in a heating mode, the source 114 is configured to provide hot fluid. For a typical system using water as the fluid media, hot water is provided at a temperature of about 95 degrees Fahrenheit when the HVAC system 110 is operating in a heating mode. In the heating mode, the controller 126 and actuator 122 are configured to operate in a reverse actuation mode, in which the actuator 122 drives the valve 112 toward a closed position, to reduce the flow of hot fluid to the heat exchanger 116 when the room temperature rises above the desired temperature for the space, and when the room temperature drops below the desired temperature for the space 118, the actuator 122 drives the valve 112 toward an open position, to increase the flow of hot fluid to the heat exchanger 116.

When it is desired to operate the HVAC system 110 in a cooling mode, the source 114 is configured to provide cold fluid. For a typical system using water as the fluid media, cold water is provided at a temperature of about 55 degrees Fahrenheit when the HVAC system 110 is operating in a cooling mode. In the cooling mode, the controller 126 and actuator 122 are configured to operate in a direct actuation mode, in which the actuator 122 drives the valve 112 toward an open position, to increase the flow of cold fluid to the heat exchanger 116, when the room temperature rises above the desired temperature for the space, and when the room temperature drops below the desired temperature for the space 118, the actuator 122 drives the valve 112 toward a closed position, to reduce the flow of cold fluid to the heat exchanger 116.

The changeover between heating and cooling modes typically takes place only twice a year, in the spring and fall, and generally requires some degree of manual reconfiguring of operating components (not shown), such as valves, or switches, within the source 114. The changeover may also involve more complex activities within the source, such as starting or shutting down a boiler used for heating the fluid during operation in the heating mode, and concurrently shutting down or starting a chiller used for cooling the fluid during operation in the cooling mode.

The changeover between heating and cooling modes also requires re-configuring the controller 126 and actuator 122 in each of the spaces 118, to change from reverse actuation mode to direct actuation mode when the HVAC system 110 is changed from heating to cooling mode, and conversely to change from direct actuation mode to reverse actuation mode when the HVAC system 110 is changed from cooling to heating mode. If the actuation mode is not properly reconfigured to match the operating mode of the source 114, the HVAC system 110 will operate backwards from the way it should.

For example, if the controller 126 and actuator 122 are left in the direct actuation mode with the source 114 in heating mode, the valve 112 will open wider and supply more hot fluid to the space 118 when the room temperature rises above the desired temperature, and will close down and supply less hot fluid to the space when the room temperature drops below the desired temperature. The result of this being that the space 118 becomes hotter and hotter, or colder and colder, once the HVAC system 110 turns on, and never reaches the desired temperature through operation of the HVAC system 110.

Conversely, if the controller 126 and actuator 122 are left in the reverse actuation mode with the source 114 in cooling mode, the valve 112 will close down and supply less cold fluid to the space 118 when the room temperature rises above the desired temperature, and will open further and supply more cold fluid to the space when the room temperature drops below the desired temperature. The result of this once again being that the space 118 becomes hotter and hotter, or colder and colder, once the HVAC system 110 turns on, and never reaches the desired temperature through operation of the HVAC system 110.

Historically, in order to keep the actuation mode in proper relationship to the operating mode of the HVAC system 110, it was necessary to physically change the position of switches, jumpers, or wires on the controllers 126 and/or actuators 122 in each of the spaces 118 when the operating mode of the source 114 was changed. Having to reconfigure the controllers 126 and/or actuators 122 in each space 118 is obviously time consuming, and fraught with opportunity for missing one of more spaces 118 in an HVAC system 110 serving a large multi-unit building. It is also intrusive to the occupants of the spaces 118, for someone to have to enter their space 118 twice a year to reconfigure the controller 126 and/or actuator 122.

In addition, the change of seasons is often unpredictable. A sudden heat wave after a building is switched over to heating mode, or a cold spell after switching to cooling mode, can leave the occupants of the spaces 118 without the ability to set the room temperature at a comfortable level. Even if the operating mode of the source 114 were to be changed back, as a result of the sudden heat or cold spell, it would be necessary to re-enter all of the spaces 118 to reconfigure the controllers 126 and/or actuators 122 accordingly, and then repeat the reconfiguration process yet again, for the source 114 and controllers 126 and/or actuators 122 when the sudden hot or cold spell had passed. Normally, building operators will not want to expend all of this effort during an unseasonable hot or cold spell, thereby leaving the occupants of the spaces 188 without the ability to set the room temperature of their space 118 at a comfortable level, until the hot or cold spell has passed.

It is desirable, therefore to have an apparatus and method for automatically reconfiguring the controllers 126 and/or actuators 122 in each space 118 when the operating mode of the source 114 is changed from heating to cooling or vice versa.

FIG. 2 shows a prior approach to addressing the problems discussed above, by providing an apparatus and method for automatically reconfiguring the controllers 126 and/or actuators 122 in each space 118 when the operating mode of the source 114 is changed from heating to cooling or vice versa. In the apparatus shown in FIG. 2, a temperature sensor or thermostatically operated switch 128 is attached to a pipe 130, at a point upstream from each of the heat exchangers 116 in the HVAC system 110. The temperature sensor or switch 128 associated with each heat exchanger 116 generates a temperature signal 132, indicative of whether the source 114 is supplying hot or cold fluid to that heat exchanger 116. The temperature signal 132 from each temperature sensor or switch 128 is transmitted over a separate set of wires 134 to the controller 126 in the space 118 served by the particular heat exchanger 116 associated with that temperature sensor or switch 128. The controller 126 and/or actuator 122 in the space 118 served by that heat exchanger 116 are operatively configured to receive the temperature signal 132 from the temperature sensor 128 associated with the heat exchanger 116 serving that particular space 118, and determine whether the source 114 is currently configured for supplying hot or cold fluid to that space 118. The actuator 122 is then controlled in the direct actuation mode if the cold fluid, or alternatively in the reverse actuation mode, it the source 114 is currently configured for supplying hot fluid.

While the prior apparatus and method, described above and shown in FIG. 2, generally work well for the intended purpose of automatically reconfiguring the controller 126 and or actuator 122 when the HVAC system 110 operating mode is changed, there are several areas in which further improvement is desirable. It is cumbersome and time consuming to have to individually attach the temperature sensors 128 to the piping serving the heat exchangers 116, and run the wires back to the appropriate controller 126. Reliability is also somewhat reduced, in that the sensor 128 and the separate set of wires 134 for each space 118 are exposed and vulnerable to damage. In particular, if it should be necessary to make any plumbing repairs to the piping supplying fluid to the heat exchanger 116, the sensor 128 may need to be removed and reattached to a new section of pipe, or so that it is not damaged by heating the pipe during sweat soldering which may be required in making the repairs.

It is desirable, therefore, to provide an improved apparatus and method addressing the problems described above, for automatically reconfiguring the controller 126 and or actuator 122 when the operating mode of the HVAC system 110 is changed.

BRIEF SUMMARY OF THE INVENTION

The invention provides an apparatus and method for determining the temperature of an operating fluid media in an HVAC system, through the use of an integral temperature sensor mounted within an actuator of an actuator-driven HVAC valve for sensing the temperature of a valve body of the HVAC valve. The temperature of a fluid media within the HVAC valve may then be determined from the temperature of the valve body. A processor may be operatively connected to the integral temperature sensor for configuring the actuator to function in either a direct acting mode, or alternatively in a reverse acting mode, as a function of the temperature of the valve body as sensed by the integral temperature sensor. The processor may be located within the actuator.

The actuator may be adapted for attachment to the HVAC valve in such a manner that the temperature sensor is placed in operative thermal contact with the valve body. The actuator may also be adapted for attachment to the HVAC valve in such a manner that the temperature sensor is placed in operative thermal contact with the valve body by the act of attaching the actuator to the HVAC valve.

The valve body and actuator may include complementary mating mounting elements, for securing the actuator to the valve body, with the temperature sensor being attached to the actuator for sensing the temperature of the mounting element of the valve body, when the actuator is attached to the HVAC valve. The actuator and valve body may also be configured in such a manner that the temperature sensor is placed in operative thermal contact with the mounting element of the valve body, and may be further adapted in such a manner that the temperature sensor is placed in operative thermal contact with the mounting element of the valve body by the act of attaching the actuator to the HVAC valve.

In one form of the invention, an apparatus for controlling a flow of fluid from a source of fluid in an HVAC system, is provided. The apparatus includes an HVAC valve having a valve body adapted for operative connection to the source of fluid, and an actuator adapted for operative attachment to the HVAC valve, for controlling the valve, and having an integral temperature sensor for sensing the temperature of the valve body, when the actuator is attached to the HVAC valve. The apparatus may further include a processor operatively connected to the temperature sensor for determining the temperature of a fluid media within the valve body from the sensed temperature of the valve body. The processor may be mounted within the actuator. The processor may be adapted for configuring the actuator for operation in either a direct acting mode, or alternatively in a reverse acting mode, as a function of the determined temperature of the fluid media in the valve body. The processor may be mounted within the actuator.

The invention may also take the form of a method for determining the temperature of a valve body of an actuator-driven valve, or a method for determining a media temperature of a media within the valve body, or a method for controlling a flow of fluid through an HVAC valve.

Other aspects, objectives and advantages of the invention will be apparent from the following detailed description and the accompanying drawings.

BRIEF DESCRIPTION OF THE DRAWINGS

FIG. 5 is a partial cross section of the HVAC valve apparatus of FIG. 4.

FIG. 7 is a view taken along line 7-7 in FIG. 5.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
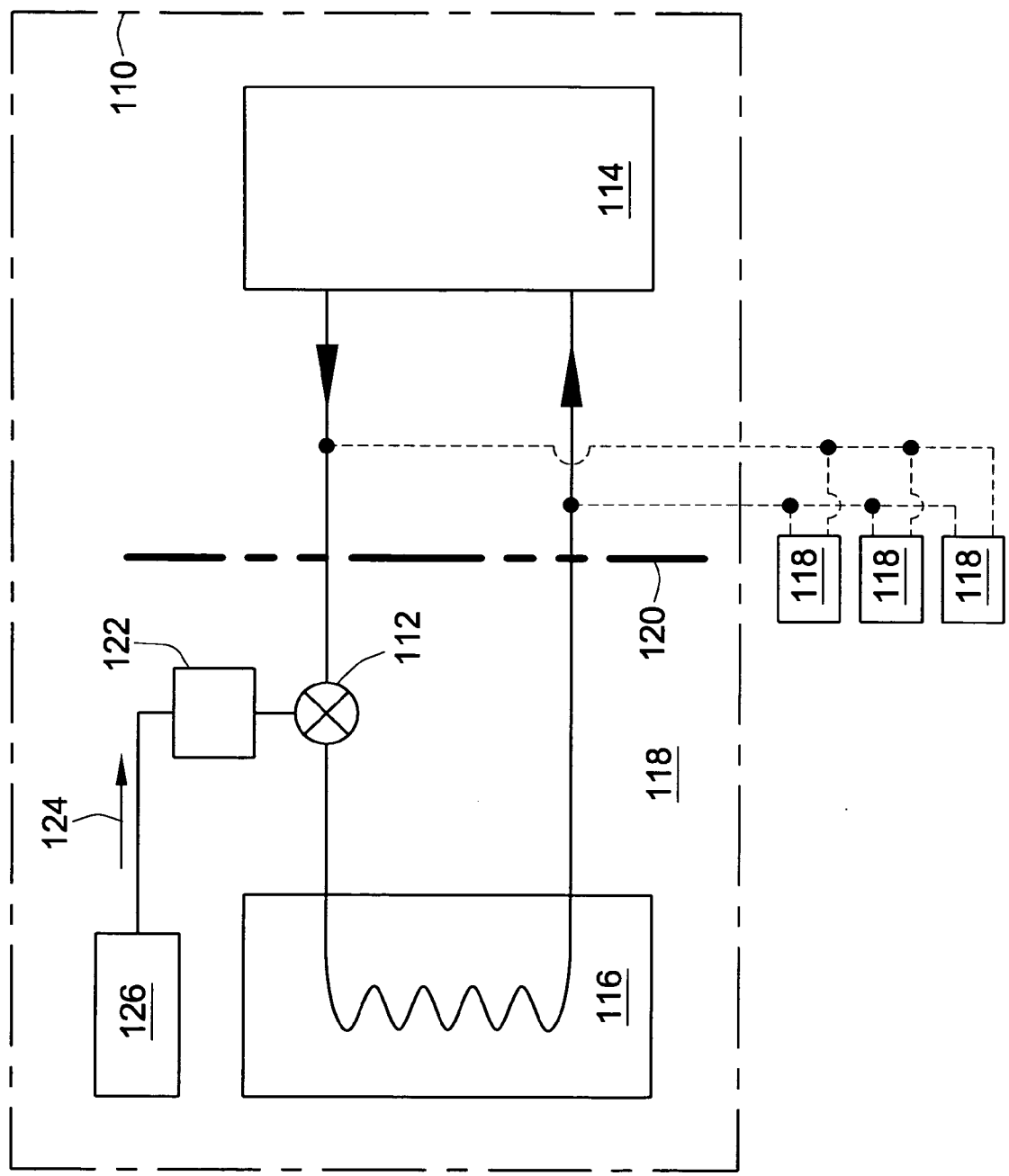
FIG. 1 is a schematic representation of a prior heating, ventilation, and air conditioning (HVAC) system, which required that an HVAC valve in each conditioned space be manually reconfigured when the HVAC system was changed from heating to cooling mode, and vice-versa.
Figure 2:
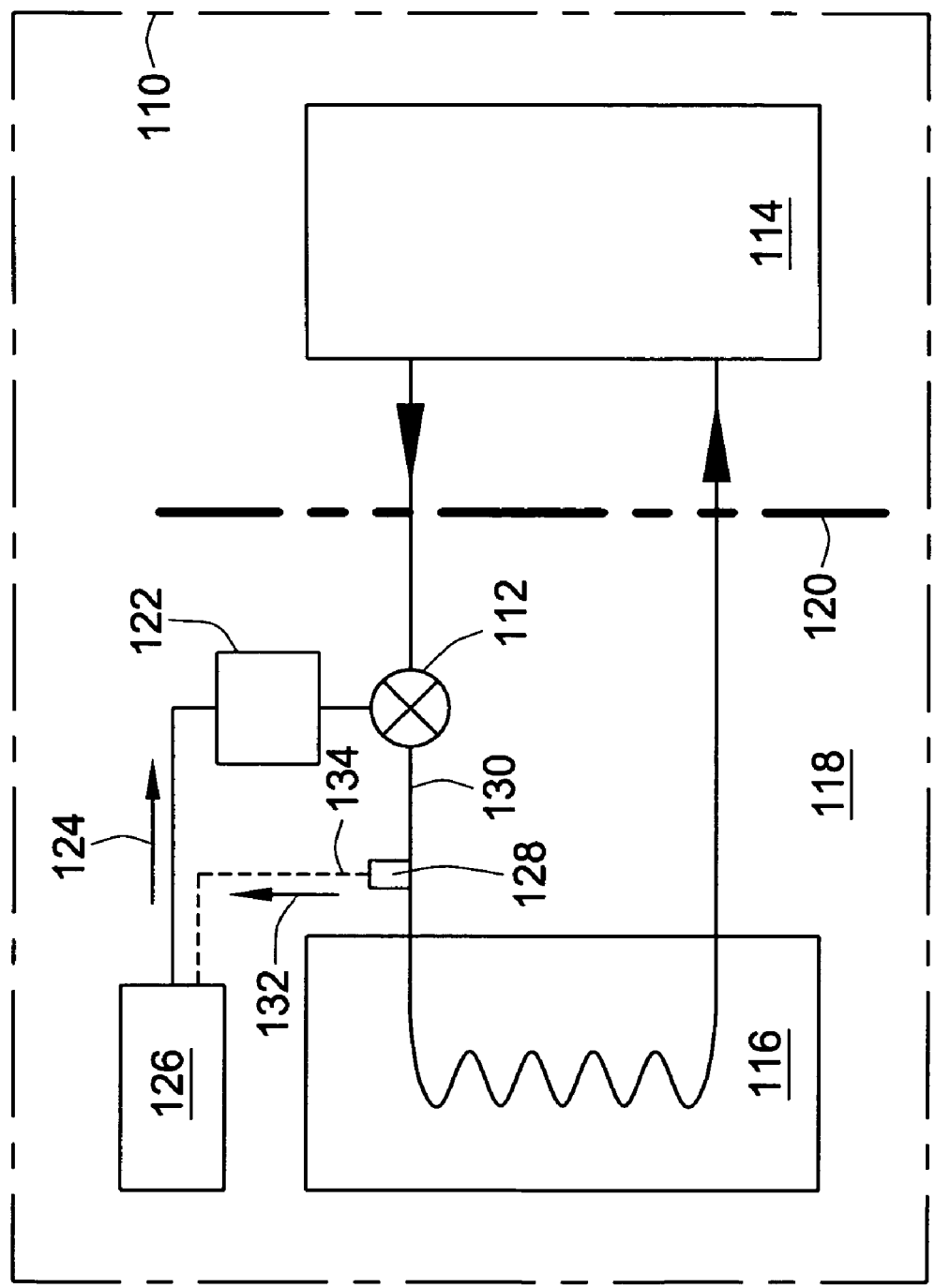
FIG. 2 is a schematic representation of a second prior HVAC system, having a temperature sensor mounted on a fluid conduit of the HVAC system and connected by wires to a controller in the conditioned space for facilitating the changeover from heating to cooling mode, and vice versa.
Figure 3:
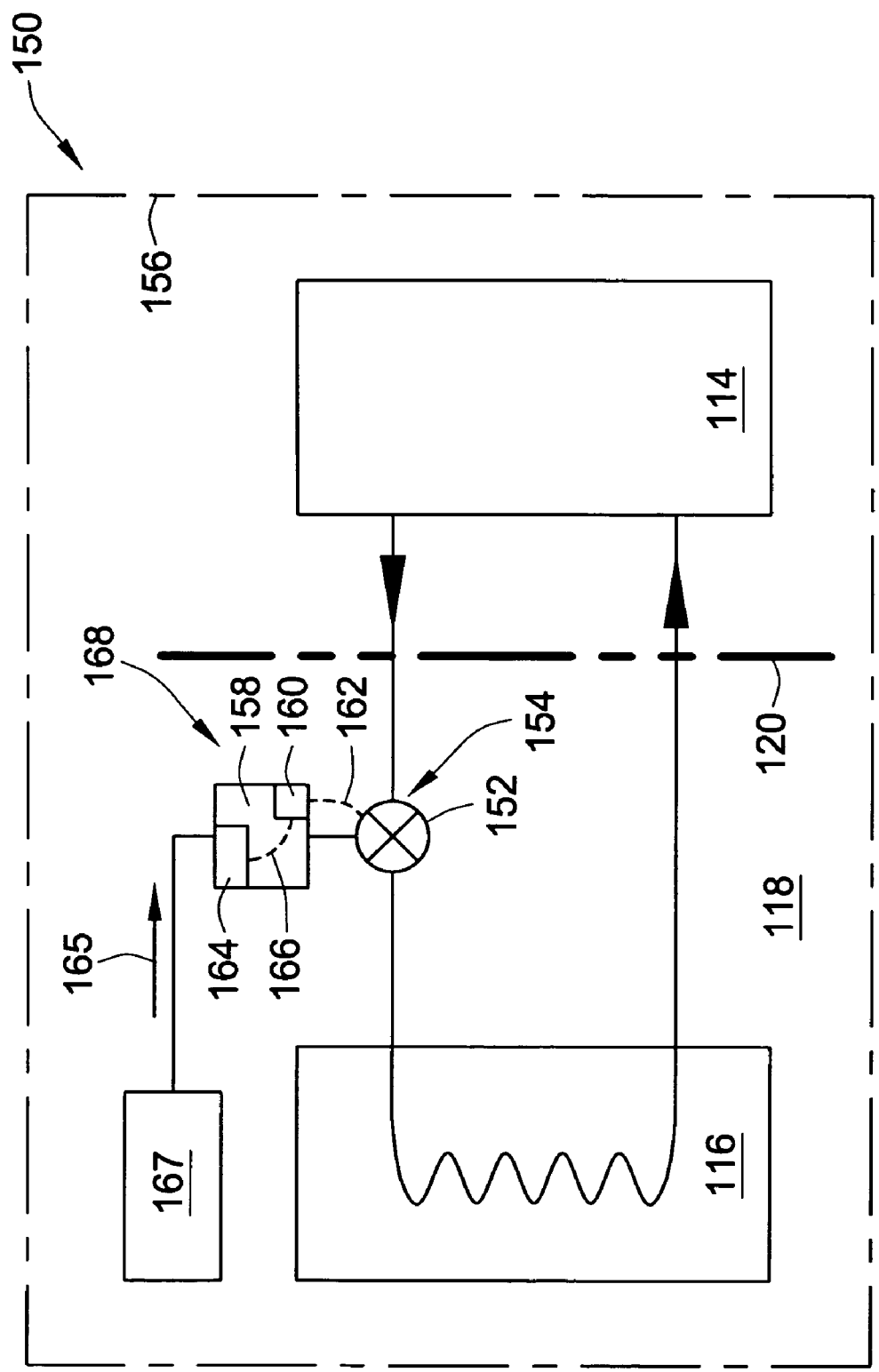
FIG. 3 is a schematic representation of an exemplary embodiment of an HVAC system, according to the invention, having an integral temperature sensor and processor, mounted within an actuator of an actuator-driven HVAC valve for sensing the temperature of a valve body of the HVAC valve and for automatically reconfiguring the HVAC valve when the HVAC system was changed form heating to cooling mode, and vice-versa.

FIG. 3 shows a first exemplary embodiment of an apparatus 150, according to the invention, for determining a temperature of a valve body 152 of an actuator-driven HVAC valve 154 in a heating ventilation and air conditioning (HVAC) system 156. The apparatus 150 includes, an actuator 158 adapted for attachment to the HVAC valve 154. The actuator 158 includes an integral temperature sensor 160, which is operatively connected to the valve body 152, as indicated by a dashed line 162, for sensing the temperature of the valve body 152 when the actuator 158 is attached to the HVAC valve 154.

The exemplary embodiment of the apparatus 150, according to the invention, also includes a processor 164, which is operatively connected to the integral temperature sensor 160, as indicated by dashed line 166, for determining the temperature of the valve body 152. As shown in FIG. 3, the processor 164 is preferably mounted within the actuator 158, but can be mounted remotely from the actuator 158 in other embodiments of the invention.

The processor 164 in the exemplary embodiment is utilized for determining the temperature of a fluid media in the valve body 152, from a signal received from the integral temperature sensor 160. The processor 164 of the exemplary embodiment also configures the actuator 158 for operation in either a direct acting mode, or alternatively in a reverse acting mode, as a function of the determined temperature of the fluid media within the valve body 152.

As illustrated in FIG. 3, the processor 164 of the exemplary embodiment receives a control signal 165 from a controller 167, indicating the present room temperature in the space 118, and a desired room temperature for the space 118. In addition to the present room temperature and desired room temperature signals, the processor also receives the valve body temperature signal supplied by the integral temperature sensor 160. From these three temperatures, the processor 164 can determine whether the present room temperature is above or below the desired temperature, and whether opening the HVAC valve 154 will result in the present room temperature being driven toward the desired room temperature.

If the present room temperature needs to be raised, for example, the processor 164 will determine, from the valve body temperature, whether the HVAC valve 154 is currently connected to a source of hot or cold fluid media. If the HVAC valve 154 is connected to a source of hot fluid when heating is needed, the processor 164 will configure the actuator 158 to operate in a reverse acting mode, and cause the actuator 154 to modulate flow through the HVAC valve 154 to bring the present room temperature up to the desired room temperature. If, however, the processor 164 determines that the HVAC valve 154 is connected to a source of cold fluid, when the room temperature is below the desired temperature, the processor 164 will cause the actuator 154 to close the HVAC valve 154.

Conversely, if the present room temperature needs to be lowered to the desired temperature, the processor will determine from the valve body temperature whether the HVAC valve 154 is currently connected to a source of hot or cold fluid media. If the HVAC valve 154 is connected to a source of cold fluid when cooling is needed, the processor 164 will configure the actuator 158 to operate in a direct acting mode, and cause the actuator 154 to modulate flow through the HVAC valve 154 to bring the present room temperature down to the desired room temperature. If, however, the processor 164 determines that the HVAC valve 154 is connected to a source of hot fluid, when the room temperature is above the desired temperature, the processor 164 will cause the actuator 154 to close the HVAC valve 154.

The functions performed by the processor 164 may be different in other embodiments of the invention. It may be desirable, in fact, in some embodiments to not have a processor, and instead have the integral temperature sensor provide a signal to a remotely mounted controller 167, or directly to the actuator 158. In embodiments including a processor 164, the processor 164 may be configured only to determine the temperature of the valve body 152, only to determine the temperature of a fluid media within the valve body 152, only to configure the actuator 158 into the direct or reverse acting modes, or combinations of these and other functions.

Those having skill in the art will thus recognize that the present invention provides considerable functional advantages over prior HVAC apparatuses in which the HVAC valves 112 had to be manually reconfigured to change them from direct to reverse acting mode, or vice versa, whenever the source 114 was changed between heating and cooling modes of operation.

An apparatus, according to the invention, also provides considerable structural advantages and increased reliability over prior HVAC systems, as illustrated by the exemplary embodiment of FIGS. 4-7.

Figure 4:
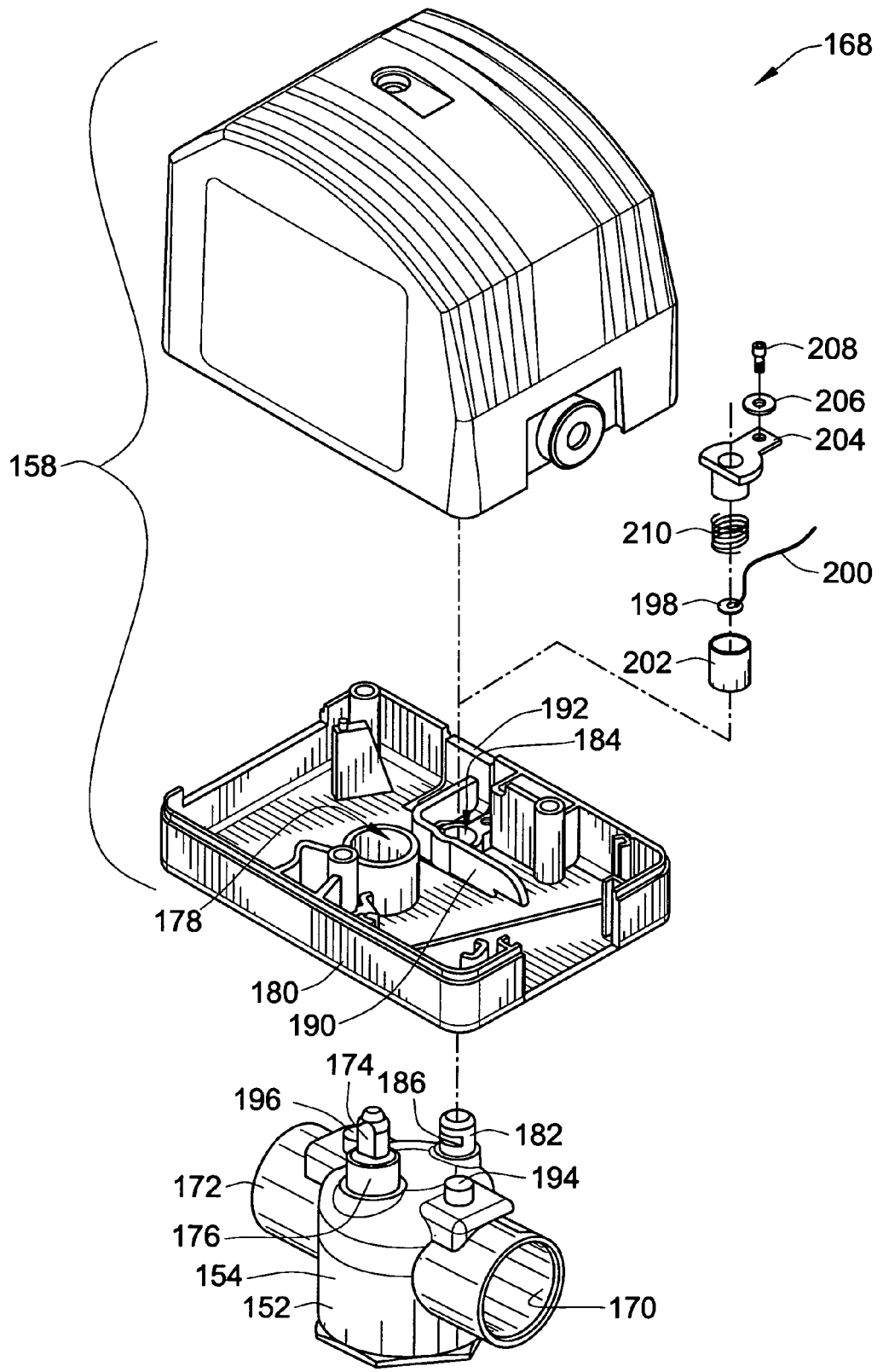
FIG. 4 is a partially exploded perspective view of an exemplary embodiment of an HVAC valve apparatus, according to the invention.

As shown in FIG. 4, an exemplary embodiment of the actuator driven HVAC valve apparatus 168, according to the invention, includes the HVAC valve 154 and the actuator 158. The HVAC valve 154 includes a valve body 152 having fittings 170, 172 for attaching the valve body 152 into a piping circuit of the HVAC system 156. The valve 168 includes internal components (not shown) which are positioned by turning a shaft 174 extending from the valve body 152. The actuator 158 includes a motor (not shown) that engages the shaft 174 when the actuator 158 is mounted on the HVAC valve 154, so that the motor can be used for turning the shaft 174 to modulate a flow of fluid media through the valve body 152. The actuator 158 may also include the processor 164, as shown in FIG. 3, or other elements for controlling the motor.

Figure 6:
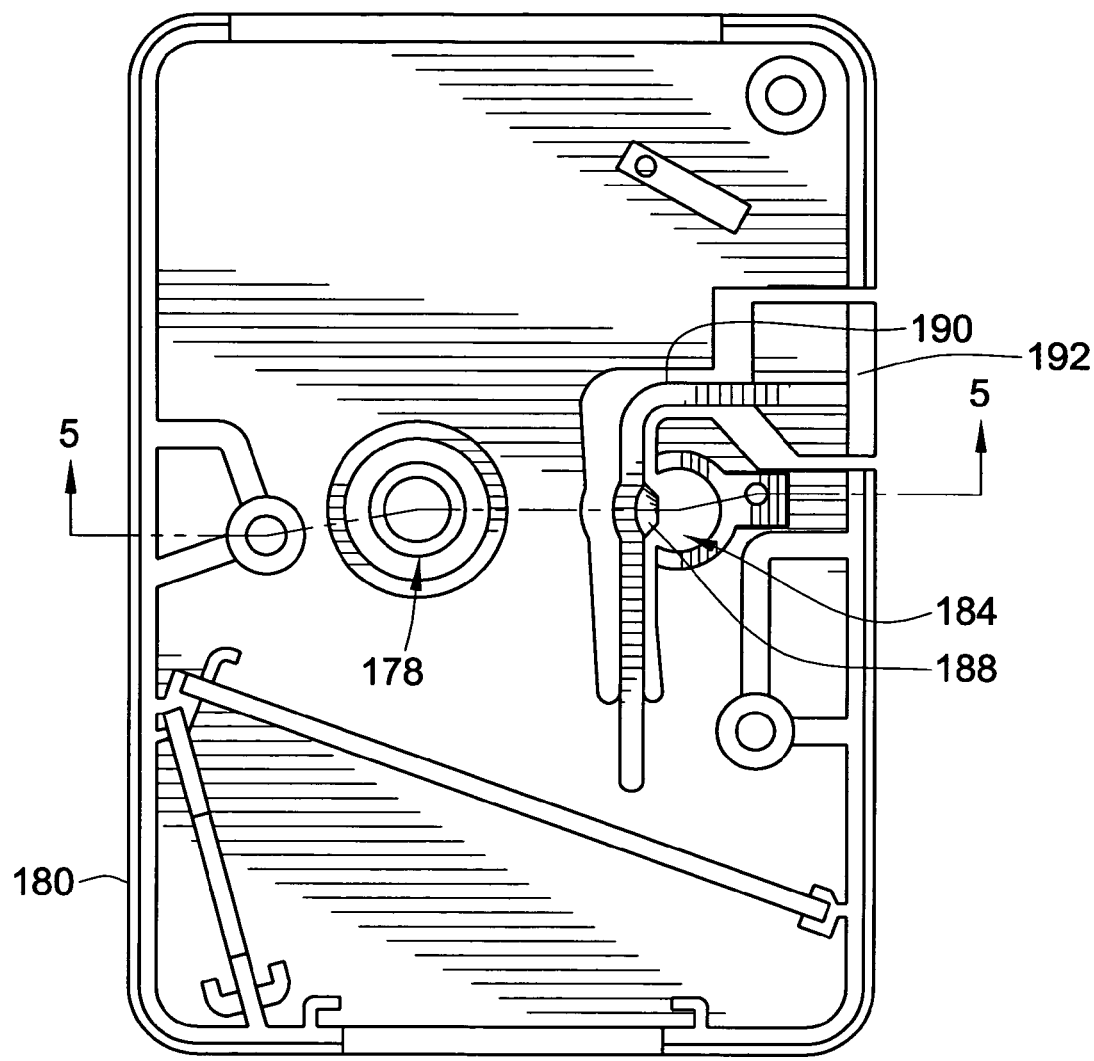
FIG. 6 is a top view of a baseplate of an actuator of the HVAC valve apparatus shown in FIGS. 4 and 5.

As shown in FIGS. 4-6, the valve body 152 includes a pilot 176 extending upward about the shaft 174, for engagement with a motor shaft hole 178 in a baseplate 180 of the actuator 158. The valve body 152 also includes a locking lug 182, extending upward from the valve body 152 in a direction generally parallel to the pilot 176, for engagement with a locking lug hole 184 in the baseplate 180. The locking lug 182 includes a notch 186 therein, that engages with a locking tab 188 on a movable latching tang 190 of the baseplate 180, to lock the actuator 158 on to the valve body 158 of the HVAC valve 154 when the pilot 176 and locking lug 184 are inserted respectively into the motor shaft hole 178 and locking lug hole 184 in the baseplate 180. The distal end of the latching tang 190 includes a push button portion 192 which can be depressed to un-latch the locking tab 188 from the notch 186 in the locking lug 184, so that the actuator 158 may be readily separated from the HVAC valve 154. The valve body 152 also defines a pair of axial support lugs 194, 196 that engage a lower surface of the baseplate 180, when the actuator 158 is latched onto the HVAC valve 154.

As shown in FIGS. 4 and 5, the actuator 158 further includes an integral temperature sensor 198 for sensing the temperature of the valve body 152 when the actuator 158 is attached to the valve 168. The temperature sensor 198 can take a variety of appropriate forms, including as a thermistor, or a thermocouple. The temperature sensor 198 of the exemplary embodiment, shown in FIGS. 4 and 5, takes the form of a thermistor attached to a small metal disc having wires 200 extending therefrom for operatively connecting the integral temperature sensor 198 to the processor 164.

The integral temperature sensor 198 is attached to the bottom inside surface of a cup 202 made from metal, or another material having good thermal conductivity. The cup 202 is slidingly disposed within the locking lug hole 184, and retained therein between the locking tab 188 and a retainer 204 that is attached to the baseplate 180 by a washer and screw 206, 208. A helical compression spring 210 is disposed between the inside endwall of the cup 202 and the retainer 204, for urging the cup to rest firmly against the upper end of the locking lug 182 when the actuator 158 is attached to the valve 168.

From the foregoing discussion, it will be appreciated that the actuator 158 is adapted for attachment to the valve 168 in such a manner that the temperature sensor 198 is placed in operative thermal contact with the valve body 152. By virtue of having the temperature sensor 198 located in the spring loaded cup 202 within the locking lug hole 184, the temperature sensor 198 is placed in operative thermal contact with the valve body 152 by the act of attaching the actuator to the valve 168.

The valve body 152 and actuator 158 include complementary mating mounting elements, in the form of the locking tab 188 and the locking lug 182 for securing the actuator 158 to the valve body 152, and the temperature sensor 198 is attached to the actuator 158 for sensing the temperature of the locking lug 182 (i.e. one of the mounting elements of the valve body), when the actuator 158 is attached to the HVAC valve 154. It will further be understood from the foregoing description, that in the exemplary embodiment, the actuator 158 and valve body 152 are further configured in such a manner that the temperature sensor 198 is automatically placed in operative thermal contact with the locking lug 182 of the valve body 152 by the act of attaching the actuator 158 to the valve 152, without any conscious effort or attention on the part of the person attaching the actuator 158 to the valve body 152.

Those having skill in the art will also recognize that, although invention has been described herein with reference to several exemplary embodiments, many other embodiments of the invention are possible. For example, although all of the exemplary embodiments of the HVAC valve 156 described herein utilize a temperature sensor 198 operatively connected to a processor 164 located in the actuator 158, in other embodiments, the processor 164 may be located external to the actuator 158. Other arrangements may also be used for establishing thermal contact between the valve body 152 and an integral temperature sensor of the actuator. The invention may also be practiced with valves having a different valve body configuration than the valve body 152 used in the exemplary embodiments expressly disclosed herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for determining the temperature of a valve body of an actuator-driven HVAC valve in a heating ventilation and air conditioning system (HVAC valve), the method comprising:

attaching an actuator, for controlling the HVAC valve and having an integral temperature sensor for sensing the temperature of the valve body, to the HVAC valve;

sensing a temperature of the valve body, using the integral temperature sensor; and incorporating a processor programmed for determining a media temperature of a media within the valve body from the temperature of the valve body.

2. The method of claim 1, further comprising, configuring the actuator for operation in either a direct acting or alternatively in a reverse acting mode as a function of the temperature of the valve body as sensed by the integral temperature sensor.

3. The method of claim 1, further comprising, configuring the actuator for operation in either a direct acting or alternatively in a reverse acting mode as a function of the determined media temperature.

4. The method of claim 1, further comprising, attaching the actuator to the HVAC valve in such a manner that the temperature sensor is placed in operative thermal contact with the valve body.

5. The method of claim 1, further comprising, attaching the actuator to the HVAC valve in such a manner that the temperature sensor is placed in operative thermal contact with the valve body by the act of attaching the actuator to the HVAC valve.

6. The method of claim 1, wherein the valve body and actuator include complementary mating mounting elements, for securing the actuator to the valve body, and the method further comprises, sensing the temperature of the mounting element of the valve body.

7. The method of claim 6, further comprising, attaching the actuator to the valve body in such a manner that the temperature sensor is placed in operative thermal contact with the mounting element of the valve body.

8. The method of claim 6, further comprising, attaching the actuator to the valve body in such a manner that the temperature sensor is placed in operative thermal contact with the mounting element of the valve body by the act of attaching the actuator to the HVAC valve.

9. An apparatus for determining a temperature of a valve body of an actuator-driven HVAC valve in a heating ventilation and air conditioning (HVAC) system, the apparatus comprising, an actuator adapted for attachment to the HVAC valve and for controlling the HVAC valve, the actuator having an integral temperature sensor for sensing the temperature of the valve body when the actuator is attached to the HVAC valve, and a processor operatively connected to the temperature sensor, the processor programmed to determine a media temperature of a media within the valve body from the temperature of the valve body.

10. The apparatus of claim 9, wherein, the processor is mounted within the actuator.

11. The apparatus of claim 9, wherein the processor also configures the actuator for operation in either a direct acting mode, or alternatively in a reverse acting mode, as a function of the determined temperature of the HVAC valve.

12. The apparatus of claim 11, wherein, the processor is mounted within the actuator.

13. The apparatus of claim 9, further comprising, a processor operatively connected to the temperature sensor for determining the temperature of a fluid media within the valve body from the sensed temperature of the valve body.

14. The apparatus of claim 13, wherein, the processor is mounted within the actuator.

15. The apparatus of claim 13, wherein the processor also configures the actuator for operation in either a direct acting mode, or alternatively in a reverse acting mode, as a function of the determined temperature of the fluid media in the valve body.

16. The apparatus of claim 15, wherein, the processor is mounted within the actuator.

17. The apparatus of claim 9, further comprising, a processor operatively connected to the integral temperature sensor for configuring the actuator for operation in either a direct acting mode, or alternatively in a reverse acting mode, as a function of the temperature of the valve body as sensed by the integral temperature sensor.

18. The apparatus of claim 17, wherein, the processor is mounted within the actuator.

19. The apparatus of claim 9, wherein the actuator is further adapted for attachment to the HVAC valve in such a manner that the temperature sensor is placed in operative thermal contact with the valve body.

20. The apparatus of claim 19, wherein the actuator is further adapted for attachment to the HVAC valve in such a manner that the temperature sensor is placed in operative thermal contact with the valve body by the act of attaching the actuator to the HVAC valve.

21. The apparatus of claim 20, wherein the valve body and actuator include complementary mating mounting elements, for securing the actuator to the valve body, and the temperature sensor is attached to the actuator for sensing the temperature of the mounting element of the valve body, when the actuator is attached to the HVAC valve.

22. The apparatus of claim 21, wherein the actuator and valve body are further configured in such a manner that the temperature sensor is placed in operative thermal contact with the mounting element of the valve body.

23. The apparatus of claim 22, wherein the actuator is adapted for attachment to the valve body in such a manner that the temperature sensor is placed in operative thermal contact with the mounting element of the valve body by the act of attaching the actuator to the valve.

24. An apparatus for controlling a flow of fluid from a source of fluid in a heating ventilation and air conditioning (HVAC) system, the apparatus comprising:

an HVAC valve having a valve body adapted for operative connection to the source of fluid;

an actuator adapted for operative attachment to the HVAC valve, for controlling the HVAC valve, and having an integral temperature sensor for sensing the temperature of the valve body, when the actuator is attached to the HVAC valve; and a processor operatively connected to the temperature sensor, the processor programmed to determine a media temperature of a fluid media within the valve body from the sensed temperature of the valve body.

25. The apparatus of claim 24, wherein, the processor is mounted within the actuator.

26. The apparatus of claim 24, wherein the processor also configures the actuator for operation in either a direct acting mode, or alternatively in a reverse acting mode, as a function of the determined temperature of the fluid media in the valve body.

27. The apparatus of claim 26, wherein, the processor is mounted within the actuator.

28. A method for controlling a flow of fluid from a source of fluid in a heating ventilation and air conditioning (HVAC) system, the method comprising:

operatively connecting an actuator controlled HVAC valve to the source of fluid, with the HVAC valve having a valve body and an actuator, and the actuator including an integral temperature sensor for sensing the temperature of the valve body when the actuator is connected to the valve body;

sensing the temperature of the valve body;

controlling the HVAC valve with the actuator as a function of the temperature of the valve body as sensed by the integral temperature sensor; and incorporating a processor programmed for determining a media temperature of a media within the valve body from the temperature of the valve body.

29. The method of claim 28, wherein controlling the HVAC valve includes configuring the actuator for operation in either a direct acting mode, or alternatively in a reverse acting mode, as a function of the sensed temperature of the valve body.

30. The method of claim 29, further comprising, operatively connecting the processor to the temperature sensor for determining the temperature of the valve body.

31. The method of claim 30, further comprising disposing the processor within the actuator.

32. The method of claim 30, further comprising configuring the actuator for operation in either a direct acting mode, or alternatively in a reverse acting mode, as a function of the determined temperature of the fluid media in the valve body.

33. The method of claim 32, further comprising disposing the processor within the actuator.

* * * * *